United States Patent [19]

Torrant

[11] 3,986,754

[45] Oct. 19, 1976

[54] BEARING WITH AXIAL FIT-UP RING

[75] Inventor: James Peter Torrant, Torrington, Conn.

[73] Assignee: The Torrington Company, Torrington, Conn.

[22] Filed: Aug. 18, 1975

[21] Appl. No.: 605,634

[52] U.S. Cl. .......................... 308/196; 29/148.4 A; 308/201
[51] Int. Cl.² ........................................ F16D 15/00
[58] Field of Search ............ 308/188, 189 R, 189 A, 308/195, 196, 197, 198, 207 R, 213; 29/148.4 R, 148.4 A, 149.3, 201

[56] References Cited
UNITED STATES PATENTS

| 2,651,554 | 9/1953 | Recknagel | 308/196 |
| 3,137,920 | 6/1964 | Bushi | 308/195 X |
| 3,913,993 | 10/1975 | Ernst | 308/196 |

*Primary Examiner*—Robert R. Song
*Assistant Examiner*—Gene A. Church
*Attorney, Agent, or Firm*—Frank S. Troidl

[57] ABSTRACT

The bearing has an inner race member and an outer race member. At least one of the race members has two axially separated races. Rolling members are provided in the annular space between the two race members. A permanently plastically deformed means such as a permanently plastically deformed ring separates the facing ends of the axially separated races, and provides a proper axial fit-up.

To assemble the bearing the axially separated bearing races, the deformable ring between them and the rolling members such as balls are placed within an outer race member. A force is then applied against each of the axially separated races to permanently deform the ring. The ring is permanently deformed in a manner to provide a proper axial fit-up of the bearing components.

7 Claims, 11 Drawing Figures

BEARING WITH AXIAL FIT-UP RING

This invention relates to bearings. More particularly, this invention is a new and improved bearing and method of making the same.

For certain bearings such as angular contact ball bearings, a closely controlled axial position of the raceways relative to each other within the bearing unit as well as closely controlled radial fit of the bearing components is required. The controlled radial fit can be accomplished by selective assembly methods employing measurement of inner and outer raceway diameters plus proper selection of rolling members size to ease required race manufacturing tolerances. This approach becomes quite complicated in certain types of bearings due to required conditions of end play and axial position. The interaction of both radial and axial dimensions on contact angle in the assembled bearing must be considered in determination of proper fit-up sizes and raceway axial positions. Here extremely close manufacturing tolerances on axial raceway position relative to the end face of each race and selective assembly taking into account this position plus diametral dimensions must be manipulated to accomplish the desired result of the proper bearing contact angle.

With my invention the axial fit-up of these bearings can be accomplished without requirements for extremely close raceway to bearing face axial location manufacturing tolerances and without selection of races for assembly on the basis of raceway axial position on the race.

Briefly described, the new bearing includes an inner race member and an outer race member. At least one of the race members has two axially separated races. A permanently, plastically deformed means separates the facing ends of the axially separated races and provides a proper axial fit-up.

My new method of axially fitting-up the pair of axially separated bearing races comprises assembling together the pair of axially separated races, the rolling members, a plastically deformable material, and the second race member forming part of the bearing so that the deformable material is between the inner faces of the axially separated races. A sufficient axial force is applied against the axially separated races to go beyond the yield strength or plastic limit of the deformable material, to permanently deform the material and move the axially separated races toward one another so that the raceways of the axially separated races will contact the rolling members or come into the desired proximity to them. The force is then removed or reduced to allow the material to partially expand or spring back to move the raceways axially into the proper axial fit-up position. The axially separated races are then permanently held together by an annular sleeve. When desired, the races are locked together before the force is removed if the material spring-back or expansion is not desired.

The invention as well as its many advantages may be further understood by reference to the following detailed description and drawings in which.

Like parts in the various figures will be referred to by like numbers.

Figure 1:
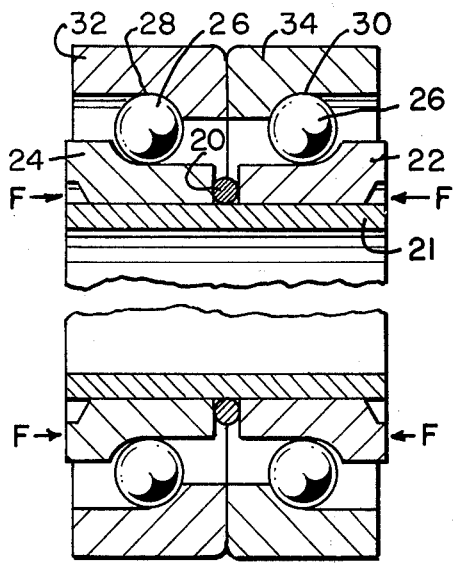
FIG. 1 is a sectional view of the parts of a unitized double row ball bearing with a plastically deformable annular ring in its original shape.

Referring to the drawings, and more particularly to FIG. 1, a soft metal ring 20 called a crush ring or axial fit-up ring is placed between the facing ends of two hardened and finished races 22 and 24. The assembled bearing with the ring 20 in place is then mounted on a sleeve 21 of proper size to control the bearing radial dimensions for which balls of the proper diameter have been selected. An axial compressive force F is then applied to the annular ring 20 through the hardened races 22 and 24 to plastically, permanently deform the ring and reduce its dimensional width as measured in the axial direction. The force is now relieved if it is desired to allow the deformed material to spring back slightly.

Figure 2:
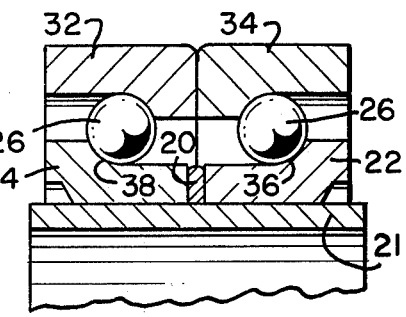
FIG. 2 is a sectional view showing the relative positions of the parts of the bearing of FIG. 1 after the proper force has been applied and the plastically deformable annular ring has been permanently deformed to a proper dimension for proper axial fit-up.

Note that in FIG. 1 the balls 26 are properly located on the raceways 28 and 30 of the outer race members 32 and 34, respectively; whereas the balls 26 are axially spaced from the raceways 36 and 38 of the axially separated races 22 and 24, respectively. Note that in FIG. 2, the annular ring 20 has been permanently deformed and the balls 26 are now in proper position on the raceways 36 and 38 of axially separated races 22 and 24, respectively. The bearing races now have the proper axial fit-up. The ends of the sleeve are now formed around the ends of the races 22 and 24 to bind them together.

In an alternative method, the races and deformable ring may be assembled in a sizing mandrel instead of the bearing sleeve and pressed together to effect the proper axial fit and then the mandrel is removed and the sleeve 21 inserted and fixed in position to hold the races and the deformed ring in their permanently fixed position.

The amount of axial compressive load required to accomplish this "fitting-up" must be of a magnitude less than will damage the hardened finished races, yet large enough so that the force of subsequent assembly and mounting of the bearing in a mechanism and axial bearing loads, will not match or exceed this load. These factors must be considered in construction of the ring size and cross-section shape, and in the ring material to give the proper compressive stress and strain relationship.

Figure 3:
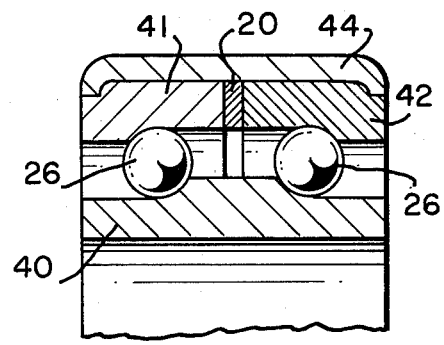
FIG. 3 is a sectional view showing a modification of my invention.

In the embodiment of FIG. 3, the inner race member consists of a single race 40 while the outer race member consists of the two axially separated races 41 and 42 having their facing ends separated by the permanently plastically deformed annular member 20. The races 40 and 42 are held together by the annular sleeve 44.

Figure 4:
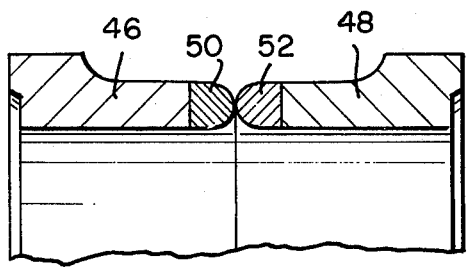
FIG. 4 is a sectional view showing a further modification of the invention.
Figure 5:
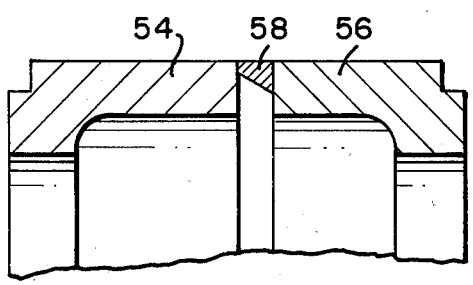
FIG. 5 is a sectional view showing another modification of the invention.
Figure 6:
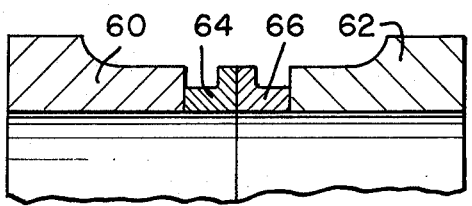
FIG. 6 is a sectional view showing still another modification of the invention.

The function of the plastically deformable ring can be served by soft formed areas on the facing ends of the axially separated races. FIG. 4, FIG. 5, and FIG. 6 show different embodiments of inner races with a plastically deformable portion on at least one of the races. In each of FIGS. 4, 5, and 6, the soft deformable portion is shown with their dimensions as they are before the forces are applied against the outsides of the axially separated races. In FIG. 4, the inner races 46 and 48 are provided at their facing and abutting ends with plastically deformable material 50 and 52, respectively. The embodiment shown in FIG. 5 shows a pair of outer races 54 and 56 with only the race 56 having a portion 58 of plastically deformable material with the plastically deformable material being adapted to contact the facing end of the outer race 54.

In the embodiment of FIG. 6, the inner races 60 and 62 have at their facing ends L-shaped plastically deformable portions 64 and 66, respectively.

Figure 7:
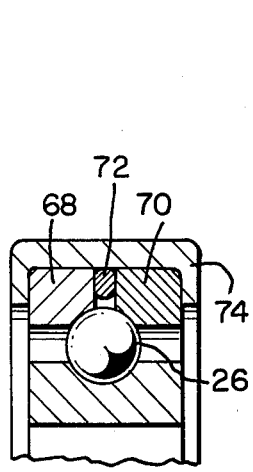
FIG. 7 is a sectional view showing a modification of the invention used in a single row ball bearing.

In FIG. 7, there is shown a single row four-point-contact ball bearing with arched contour raceways where the outer race member consists of two races 68 and 70, separated by the permanently, plastically deformed annular ring 72. The outer races 68, 70 with the ring 72 are held together by the annular sleeve 74.

Figure 8:
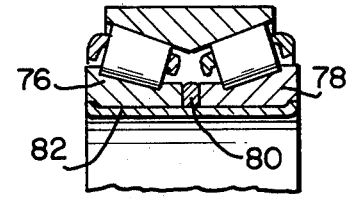
FIG. 8 is a sectional view showing a modification of my invention used with tapered rollers.

A tapered roller bearing is shown in FIG. 8. A pair of axially separated tapered roller races 76 and 78 are shown separated by the permanently plastically deformed axial fit-up ring 80. The inner races 76, 78 and the plastically deformed ring 80 are held together by the inner annular sleeve 82.

Figure 9:
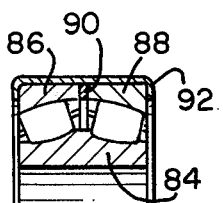
FIG. 9 is a sectional view showing a modification of the invention used with spherical rollers.

The embodiment of FIG. 9 shows a spherical roller bearing including a single inner race 84 and an outer race member including races 86 and 88, separated by the permanently plastically deformed annular ring 90. The outer races and the annular ring are held together by the annular sleeve 92.

Figure 10:
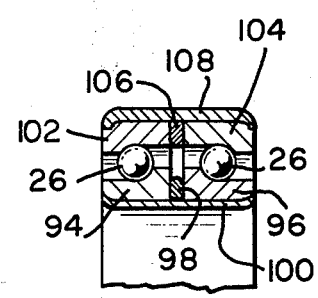
FIG. 10 is a modification of my invention showing a unitized double roll ball bearing with both the inner and outer race members consisting of two races.

In the embodiment shown in FIG. 10, both the inner race member and the outer race member consist of two axially spaced races. The inner race member includes races 94 and 96 separated by the permanently, plastically deformed inner annular ring 98 and held together by the inner annular sleeve 100. The outer race member includes the races 102 and 104 separated by the plastically deformed outer ring 106 and all held together by the outer annular sleeve 108.

Figure 11:
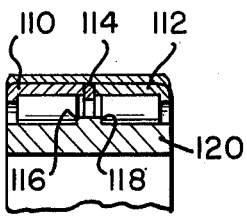
FIG. 11 is a modification of my invention used in a double row cylindrical roller bearing.

The embodiment of FIG. 11 shows a cylindrical roller bearing with the axially spaced races 110 and 112 separated by the crush ring 114. In this bearing the rollers are guided at their ends by the radial flanges 116 and 118 on inner race 120, and the amount of axial play must be and is closely controlled, but without the necessity of precision grinding the axial length of the bearing raceway.

In all embodiments showing the separate axial fit-up ring, the ring may be discontinuous and may be composed of several sections. It may also have projections on either or both sides to aid in the deformation, and it may be a "wave washer" with axial undulations. There may be two or more rings side by side in place of the single ring. In the embodiments showing the deformable sections as part of the inner ends of the races, these sections may be annular or may consist of one or more axial projections.

I claim:

1. A method of axially fitting-up a pair of axially separated bearing races forming part of a bearing having a second race radially separated from the pair of axially separated bearing races comprising: assembling together the pair of axially separated races, rolling members, plastically deformable material, and the second race so that the plastically deformable material is between the facing ends of the axially separated races, and the raceways on the axially separated races are axially spaced from the rolling members; applying sufficient axial forces against the axially separated races to go beyond the plastic limit of the deformable material to permanently deform said material so that the cross sectional length of the deformable material in the axial direction is permanently reduced, and move the axially separated races toward one another so that the raceways of the axially separated races will become properly axially spaced in relation to the rolling members; stopping the application of the axial forces; and permanently holding the axially separated races in the bearing.

2. A bearing comprising: an inner race member and an outer race member, at least one of said race members having two axially separated races; rolling members in the radial space between said two race members permanently plastically deformed means separating the facing ends of said axially separated races and providing a proper axial fit-up of the bearing components; said permanently plastically deformed means having a permanently reduced cross-sectional length measured in the axial direction when compared to the cross-sectional length measured in the axial direction of the permanently plastically deformed means before being made a part of the bearing; and separate means for holding the two axially separated races and permanently plastically deformed means together.

3. The bearing in accordance with claim 2 wherein: said plastically deformed means comprises plastically deformable material located between the facing ends of the axially separated races.

4. The bearing of claim 2 wherein said plastically deformed means is a plastically deformed annular ring located between the facing ends of the axially separated races.

5. A method of axially fitting-up a pair of bearing races, at least one of said bearing races having a plastically deformable portion abutting the other bearing race, said bearing races forming part of a bearing having a second race radially separated from the pair of bearing races comprising: assembling together the pair of separated races, rolling members, and the second race so that the raceways on the pair of bearing races are axially spaced from the rolling members; applying sufficient axial forces against the pair of races to go beyond the plastic limit of the deformable portion to permanently deform said portion so that cross-sectional length of the deformable material in the axial direction is permanently reduced, and move the pair of bearing races toward one another so that the raceways of the pair of races will become properly axially spaced in relation to the rolling members; stopping the application of the axial forces; and permanently holding the pair of races in the bearing.

6. A bearing comprising: an inner race member and an outer race member, at least one of said race members consisting of a pair of races; rolling members in the radial space between said two race members, at least one of said pair of races having a permanently plastically deformed portion abutting an axial end of the other of said pair of races and providing a proper axial fit-up of the bearing components, said permanently plastically deformed portion having a permanently reduced cross-sectional length measured in the axial direction when compared to the cross-sectional length measured in the axial direction of the permanently plastically deformed portion before being made a part of the bearing.

7. The bearing of claim 6 wherein each of said pair of races has a permanently plastically deformed portion abutting the permanently plastically deformed portion of the other races of said pair of races.

* * * * *